United States Patent [19]

Ozaki et al.

[11] 4,079,000
[45] Mar. 14, 1978

[54] PROCESS FOR REFINING ACRYLIC FIBER SOLVENT CONTAINING IMPURITIES

[75] Inventors: Masahiko Ozaki; Shigeru Nakajima, both of Okayama, Japan

[73] Assignee: Japan Exlan Company Limited, Osaka, Japan

[21] Appl. No.: 747,251

[22] Filed: Dec. 2, 1976

Related U.S. Application Data

[63] Continuation-in-part of Ser. No. 694,799, Jun. 10, 1976, abandoned.

[30] Foreign Application Priority Data

Jun. 11, 1975 Japan .................................. 50-71279

[51] Int. Cl.² .............................................. B01D 15/08
[52] U.S. Cl. ...................................... 210/31 C; 210/24
[58] Field of Search .................... 210/31 C, 31 R, 24, 210/198; 55/67

[56] References Cited

U.S. PATENT DOCUMENTS

| | | |
|---|---|---|
| 2,911,362 | 11/1959 | Wheaton ............................ 210/31 C |
| 3,134,814 | 5/1964 | Sargent et al. ..................... 210/31 R |
| 3,275,548 | 9/1966 | Walters ................................. 210/24 |
| 3,808,125 | 4/1974 | Good .................................. 210/31 C |
| 3,859,209 | 1/1975 | Jahnsen et al. ..................... 210/31 C |
| 3,931,123 | 1/1976 | Vasik et al. ........................ 210/31 C |

*Primary Examiner*—John Adee
*Attorney, Agent, or Firm*—Wenderoth, Lind & Ponack

[57] ABSTRACT

A process for purifying an acrylic fiber solvent solution which comprises (1) feeding an acrylic fiber solvent containing impurities or an aqueous solution thereof to a packed layer of a polymer consisting of one or more kinds of ester type monomers containing at least one polymerizable double bond and at least one ethylene oxide unit per molecule or a polymer consisting of such monomer(s) and one or more kinds of monomers containing at least one polymerizable double bond for one molecule, to cause said layer to catch the impurities and fiber solvent, (2) passing an eluent through said packed layer thus eluting the impurities together with the eluent, and (3) passing a further amount of the eluent through the packed layer thereby separating an eluate containing the fiber solvent.

13 Claims, 1 Drawing Figure

PROCESS FOR REFINING ACRYLIC FIBER SOLVENT CONTAINING IMPURITIES

CROSS-REFERENCE TO RELATED APPLICATIONS

This is a continuation-in-part of applicants' prior application Ser. No. 694,799, filed June 10, 1976, now abandoned.

BACKGROUND OF THE INVENTION

The present invention relates to a process for purifying an acrylic fiber solvent containing impurities or an aqueous solution thereof. More particularly, the invention is concerned with a process for purifying an acrylic fiber solvent solution which comprises feeding an acrylic fiber solvent containing impurities or an aqueous solution thereof to a packed layer of a polymer consisting of one or more kinds of ester type monomers containing at least one polymerizable double bond and at least one ethylene oxide unit essentially for one molecule or a polymer consisting of such monomer(s) and one or more kinds of monomers containing at least one polymerizable double bond for one molecule, to cause said layer to catch the impurities and fiber solvent, passing an eluent through said packed layer thus eluting the impurities together with the eluent, and passing a further amount of the eluent thereby separating an eluate containing the fiber solvent.

DESCRIPTION OF THE PRIOR ART

In the acrylic fiber production process including polymerization, dissolving and spinning steps, various sorts of organic and inorganic compounds are generally used as polymerization catalysts, anti-coloring agents, dyeability improving agents, pigments, dyes, metal chelating agents, dispersing agents, plasticizers, ultraviolet ray absorbing agents, chain transfer agents, flame retardants, flame retardant synergists, antistatic agents, softening agents, deterioration preventing agents, etc. All or part of these compounds, as they are or after having been decomposed or changed into other compounds by reacting with coexisting compounds, are dissolved or come off into the fiber solvent, thus contaminating the solvent. Further, among the fiber-forming polymers, low molecular weight polymers form a cause of the contamination of the solvent. In order that the fiber solvent thus contaminated by various impurities should be reused in the fiber production process, it has been necessary to subject the fiber solvent containing impurities to a suitable purification process after its recovery.

Among the acrylic fiber solvents, inorganic solvents cannot be purified by distillation as opposed to organic solvents, so that complicated purification processes such as adsorption filtration, precipitation filtration, recrystallization, etc. are exclusively employed. By the adsorption filtration process using activated carbon as described in U.S. Pat. No. 2,871,093, ionizable impurities cannot be removed in the least. Also, the precipitation filtration process utilizing a difference in solubility can remove only impurities having a low degree of solubility. Further, the recrystallization process suffers various defects such that the removal of impurities is imperfect, a large amount of inorganic solvent remains in the mother liquid and the recovery ratio is low, and these defects render this process impracticable.

In the purification of organic solvents, distillation is usually employed. In this process, however, a loss of solvent can be caused by the decomposition of the solvent per se. In addition, the process possesses a defect that a large amount of energy may be consumed because of a high boiling point of the solvent or contamination of azeotropic compounds. Therefore, a less expensive and more efficient purification process has been demanded.

SUMMARY OF THE INVENTION

In the light of such a situation, we made an intensive study to remove such defects. As a result, we found that, in the liquid chromatography using a packing agent of a polymer consisting of one or more kinds of ester type monomers containing at least one polymerizable double bond and at least one ethylene oxide unit essentially for one molecule or a polymer consisting of such monomers and one or more kinds of monomers containing at least one polymerizable double bond for one molecule, fiber solvents display a peculiar behavior to said packing agent as compared with organic compounds, inorganic compounds and low molecular weight polymers. By applying this finding to the purification of fiber solvents containing organic or inorganic impurities, it has been found that the organic or inorganic impurities coexisting in the fiber solvent can be separated at high efficiency. The present invention has been achieved on the basis of this finding.

The principal object of the present invention, therefore, is to provide an excellent process for the purification of an acrylic fiber solvent containing impurities.

An object of the present invention is to provide a process which will enable easy and perfect removal of impurities from a fiber solvent containing the impurities, without relying upon such an operation as recrystallization, filtration, distillation, etc.

Another object of the present invention is to restrain various side-reactions that may occur in the purification process to a minimum and to prevent the decomposition and denaturation of the fiber solvent, thereby purifying the solvent at a high efficiency.

Other objects of the present invention will become apparent from the following concrete explanation of the invention.

DESCRIPTION OF THE PREFERRED EMBODIMENTS

Figure 1:
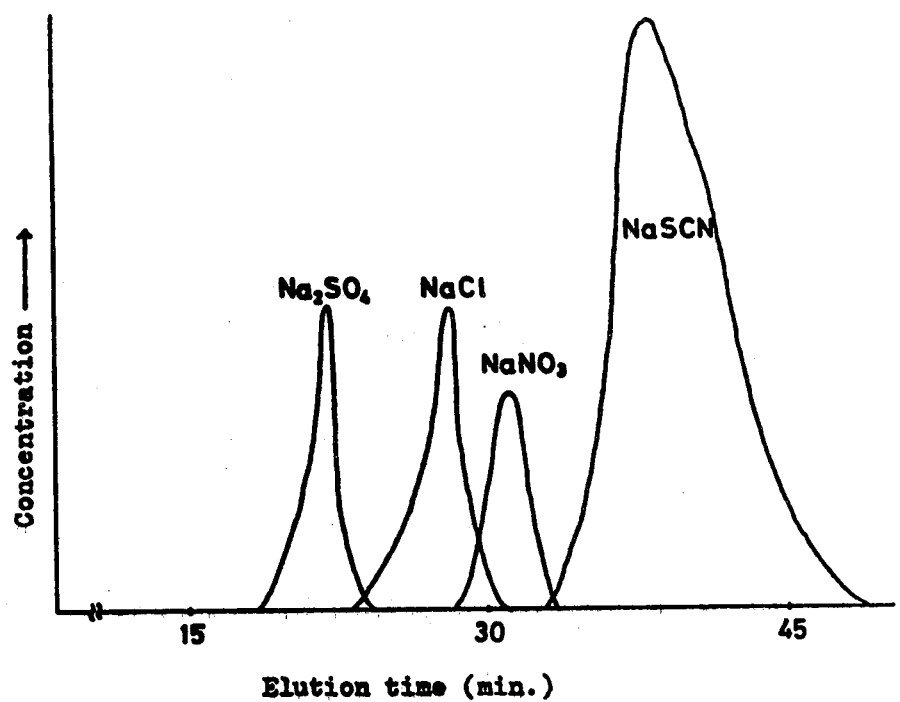
FIG. 1 of the present invention shows the elution curves obtained in Example 1.

The above-mentioned objects of the present invention can be achieved by feeding an acrylic fiber solvent containing impurities or an aqueous solution thereof to a packed layer of a polymer consisting of one or more kinds of ester type monomers containing at least one polymerizable double bond and at least one ethylene oxide unit essentially for one molecule or a polymer consisting of such monomers and one or more kinds of monomers containing at least one polymerizable double bond for one molecule to cause said layer to catch the impurities and fiber solvent, passing an eluent through said packed layer thus eluting the impurities together with the eluent and passing a further amount of the eluent thereby separating an eluate containing the fiber solvent.

In the present invention, when a fiber solvent containing impurities such as low molecular weight compounds of the fiber-forming polymers and organic or inorganic compounds got mixed into the solvent, is fed to said packed layer to cause said layer to catch the impurities and fiber solvent and thereafter an eluent is passed through said packed layer, the impurities including the low molecular weight polymers, etc. are first eluted, and then the fibers solvent is eluted. Therefore, after the impurities are eluted together with the eluent, the eluate containing the fiber solvent is separated and collected. In this way, the fiber solvent can be easily purified at a high efficiency.

The phenomenon of the later elution of the fiber solvent than the coexisting impurities, it is supposed, is not only due to the difference between the sizes of the solute molecules but also is a result of complicated interaction between said difference and the adsorptive power by the packing agent.

In the practice of the present invention, as a more concrete procedure, is employed (1) a procedure wherein the elution curve of a column packed with the packing agent consisting of the above-mentioned specified polymer is obtained beforehand and the eluate is separated on the basis of the thus-obtained curve according to the elution time or the amount of the eluate, or (2) a procedure wherein the solutes in the eluate are analyzed consecutively by a suitable analyzing method and the eluate containing the desired solute is directly separated by reference to the analytical results. As means for analyzing the concentrations of respective components in the eluate, non-destructive analyses are suitable such as the determination of ultraviolet ray absorption intensity, electric conductivity, refractive index, differential heat, hydrogen ion concentration, degree of coloring, etc. As circumstances require, two or more analytical methods may be used in combination. Upon carrying out these analyses, flow analysis can be particularly advantageously employed.

The specified polymers used as the packing agents in the present invention are polymers consisting of one or more kinds of ester type monomers containing at least one polymerizable double bond and at least one ethylene oxide unit ($-CH_2CH_2-O-$) essentially for one molecule or polymers consisting of such monomers and one or more kinds of monomers containing at least one polymerizable double bond for one molecule, and the polymers are hydrophilic and insoluble in the fiber solvents and eluents and may have cross-links introduced if required. As the ester type monomers composing such polymers, ethylene oxide addition products of aliphatic unsaturated monocarboxylic acids such as acrylic acid, methacrylic acid, etc.; and aliphatic unsaturated dicarboxylic acids such as itaconic acid, maleic acid, fumaric acid, citraconic acid, mesaconic acid, glutaconic acid, etc. or ethylene glycol esters of these acids are preferably used. As concrete examples of such polymers may be mentioned polymer consisting of ethylene glycol (meth)acrylate and ethylene glycol di(meth)acrylate, polymer consisting of polyethylene glycol (meth)acrylate and ethylene glycol di(meth)acrylate, polymer consisting of ethylene glycol (meth)acrylate and polyethylene glycol di(meth)acrylate, polymer consisting of ethylene glycol di(meth)acrylate and (meth)acrylic acid ester, polymer consisting of polyethylene glycol di(meth)acrylate and (meth)acrylic acid ester, polymer consisting of (poly)ethylene glycol (meth)acrylate and divinylbenzene, polymer consisting of polyethylene glycol (meth)acrylate, acrylonitrile and (poly)ethylene glycol (meth)acrylate, etc.

The fiber solvents that can be purified according to the process of the present invention include well-known solvents for acrylic fibers such as dimethylformamide, dimethylacetamide, dimethylsulfoxide, ethylene carbonate, $\gamma$-butyrolactone, aqueous solutions of zinc chloride, aqueous solutions of nitric acid, aqueous solutions of thiocyanates, etc. Among these solvents, organic solvents can be purified over a wide range of forms, i.e. from an hydrous state to aqueous solutions. In the case of inorganic salts such as thiocyanates, or mixtures thereof, an aqueous solution in concentration generally above 0.1%, preferably above 10% and most suitably above 30% is used. In the case of inorganic acids such as nitric acid, an aqueous solution above pH 1 is used exceptionally to prevent denaturation of the packed layer.

The amount of a fiber solvent or its aqueous solution containing impurities to be fed to a column packed with the specified polymer according to the present invention should be 1 to 30%, preferably 3 to 15% based on the column volume, for each time. Further, when said fiber solvent and an eluent are fed to the column alternately at prescribed time intervals in a continuous manner, an eluate containing the impurities and an eluate containing purified fiber solvent will alternately flow out of the outlet of the column at prescribed time intervals in a continuous manner. Therefore, by partitioning the eluate according to each section, separation of the impurities can be achieved easily.

As the eluents to be used in the present invention, water or polar solvents having a low boiling point such as alcohol and acetone may be mentioned. However, from the viewpoint of drainage disposal and economy, water is normally used as the eluent. Such eluents can be adjusted for the pH value as occasion demands. Also, in some cases, a mixture of two or more eluents can be used.

The amount of the eluent necessary for eluting the impurities caught by the column depends on the type of the packing agent packed into the column, its packing density, the column volume, the amount of the fiber solvent containing impurities to be poured into the column, the kind of the impurities and the temperature of the eluent, and thus it is difficult to limit it definitely. Anyway, the amount of use is decided by the analytical means employed in each case. The flow rate of the eluent should be varied depending on the type of the packing agent to be used, its packing density, the temperature of the eluent and the properties of the fiber solvent containing impurities, and it is also difficult to limit it definitely. In general, however, a value within the range of 0.1 to 10 ml/cm$^2$.min., preferably 0.5 to 5 ml/cm$^2$.min. is employed. Also, the temperature of the eluent or the liquid temperature in the column depends on the properties of the fiber solvent solution containing impurities, the characteristics of the column, etc. and it is difficult to limit it definitely, although a temperature generally between 0° and 100° C and preferably between 15° and 70° C is employed.

Such a process of purification according to the present invention can be widely applied to the purification of fiber solvents containing impurities generated or recovered or by-produced in the synthesis of the fiber solvents and in the production process of fibers, films, filaments, synthetic pulp, etc.

The fiber solvents to be recovered contain impurities such as low molecular weight polymers, water-soluble polymers, inorganic salts (sodium chloride, calcium chloride, sodium nitrate, inorganic sulfoxy compounds such as sodium sulfate, etc.), acrylonitrile or its derivatives (sodium-β-sulfopropionitrile, succinonitrile, adiponitrile,β,β'-oxydipropionitrile, etc.), acrylic acid, methacrylic acid, esters of these acids, acrylamide, N-methylolacrylamide, other vinyl monomers, organic sulfur compounds, organic phosphorus compounds, organic amine compounds and their salts, dispersing agents, plasticizers, white metal oxides, antistatic agents, dyeability improving agents, ultraviolet ray absorbing agents, dyes, pigments, metal chelating compounds, etc. These impurities are responsible for various troubles such as decrease in the solubility of the polymer, increase in the viscosity of the spinning solution, clogging of filters and spinnerettes, filament breaking, impairment in the quality of textile goods or others (decrease in whiteness or transparency, variation in dyeability, etc.). By the application of the purifying operation according to the present invention, such impurities can be removed and therefore the above-mentioned troubles can be completely eliminated.

In practicing the process of the present invention industrially, it is necessary to take its economy into consideration. Therefore, practical operation conditions should be established with a view chiefly to decreasing the amount of the fiber solvent coming into the eluent containing impurities. Thus, it is not always necessary to reduce the amount of the impurities in the fiber solvent to nothing, but it is sufficient to maintain the impurities at an amount within the range which does not interfere with the object of use of said solvent.

Since the fiber solvent thus-purified has been diluted to about one-fifth to one-tenth with the eluent during the purifying operation, it is provided for reuse after passing through a process for separating the eluent from the solvent or a process for concentrating the solvent (usually distillation is employed but under certain conditions reverse osmosis can be used).

The following examples are given for a better understanding of the present invention and by no means limit the scope of the invention. All parts and percentages in the foregoing text and the following examples are by weight unless otherwise specified.

EXAMPLE 1

A cross-linked polymer of ethylene glycol dimethacrylate and polyethylene glycol dimethacrylate (Merckogel PGM-2000, particle diameter 65–100μ, E. Merck & Co., Inc.) which had been swollen with water was packed into a column having an inner diameter of 15 mm. and a length of 26 cm. so that the void volume among the gel particles became 12 ml. While the column was maintained at 30° C, 2 parts of an aqueous solution of sodium sulfate in concentration of 5% was fed to the column from its top to cause the packed layer to catch the sodium sulfate. Thereafter, pure water at 30° C. as the eluent was passed through the column at the rate of 0.59 ml/cm².min. The eluate from the column was led to a differential refractometer to draw up the elution curve shown in FIG. 1. Further, in a similar way, elution curves shown in FIG. 1 were drawn up for 5% aqueous solutions of sodium chloride and sodium nitrate and a 45% aqueous solution of sodium thiocyanate, respectively. From FIG. 1, it became apparent that 33 minutes was necessary to elute the various impurities including sodium sulfate contained in 2 parts of the aqueous solution of thiocyanate. On the basis of the information thus-obtained, 2 parts of a 45% aqueous solution of sodium thiocyanate containing as impurities 5% sodium sulfate, sodium chloride and sodium nitrate, respectively was fed to the above-mentioned column to cause the packed layer to catch the impurities and sodium thiocyanate. Pure water at 30° C. was then fed to the column at the rate of 0.59 ml/cm².min. for a period of 33 minutes to elute all the impurities. Thereafter, an additional amount of pure water was passed at the same flow rate and an eluate containing sodium thiocyanate was separated and collected. In this way, an aqueous solution of sodium thiocyanate containing no impurities was obtained.

EXAMPLES 2–6

After 2 parts of the fiber solvent solutions containing impurities shown in Table 1 was fed to the same column as in Example 1 from its top, the same procedure as in Example 1 was followed except that the flow rate was 0.6 ml/cm².min. to prepare the respective elution curves. From the elution curves thus-obtained, it was found that 33, 32, 21, 23 and 23 minutes were required respectively to elute the impurities contained in the fiber solvent solutions.

On the basis of the information thus-obtained, the fiber solvent solutions containing impurities shown in Table 1 were subjected to purification treatment in the same way as in Example 1. In every case, a fiber solvent solution containing no impurities was obtained.

Table 1

| Ex. | Fiber Solvent Solution | Impurities |
|---|---|---|
| 2 | 5% aqueous sodium thiocyanate solution | Polyethylene glycol 600, polyethylene glycol 6000 and ethylene glycol, in concentration of 0.1, respectively |
| 3 | 1 N aqueous nitric acid solution | Sodium sulfate and sodium β-sulfopropionitrile, in concentration of 1%, respectively. |
| 4 | 5% aqueous zinc chloride solution | Sodium sulfate in concentration of 1% |
| 5 | 40% aqueous dimethylformamide solution | Sodium sulfate in concentration of 1% |
| 6 | 43% aqueous dimethyl sulfoxide solution | Sodium sulfite in concentration of 1% |

EXAMPLE 7

Particles (50–200μ) of a polymer consisting of polyethylene glycol (23 mols) methacrylate, polyethylene glycol (14 mols) dimethacrylate and acrylonitrile in the ratio of 30:2:68 were swollen with water and packed into a column, 15 mm. in inner diameter and 30 cm. in length, so that the void volume among the gel particles became 27 ml. Then in the same way as in Example 1, a mixed aqueous solution of sodium sulfate, sodium chloride and sodium nitrate in concentration of 0.5%, respectively and an aqueous solution of sodium thiocyanate in concentration of 20% were fed to the column and the elution curves were obtained. It was found that 41 minutes was necessary to remove the above-mentioned impurities contained in the aqueous sodium thiocyanate solution.

On the basis of the information thus-obtained, the aqueous sodium thiocyanate solution containing the impurities in the above-mentioned concentrations was subjected to purification treatment and an aqueous sodium thiocyanate solution containing no impurities was obtained.

What is claimed is:

1. A liquid chromatographic process for purifying an acrylic fiber solvent containing impurities characterized by feeding an acrylic fiber solvent containing impurities or an aqueous solution thereof to a packed layer of a polymer consisting of one or more kinds of ester type monomers containing at least one polymerizable double bond and at least one ethylene oxide unit essentially for one molecule or a polymer consisting of such monomers and one or more kinds of monomers containing at least one polymerizable double bond for one molecule to cause said layer to catch the impurities and fiber solvent, passing an eluent through said packed layer thus eluting impurities together with the eluent, and passing a further amount of the eluent thereby separating an eluate containing the fiber solvent.

2. A process as claimed in claim 1, wherein the amount of an acrylic solvent or its aqueous solution containing impurities to be fed to the packed layer each time is 1–30% based on the volume of the packed layer for each time.

3. A process as claimed in claim 2, wherein said amount is 3–15% based on the volume of the packed layer.

4. A process as claimed in claim 1, wherein the ester type monomer is an ethylene oxide adduct of an aliphatic unsaturated monocarboxylic acid or an ethylene glycol ester of the acid.

5. A process as claimed in claim 4, wherein the monocarboxylic acid is acrylic acid.

6. A process as claimed in claim 4, wherein the monocarboxylic acid is methacrylic acid.

7. A process as claimed in claim 1, wherein the ester type monomer is an ethylene oxide adduct of an aliphatic unsaturated dicarboxylic acid or an ethylene glycol ester thereof.

8. A process as claimed in claim 7, wherein the dicarboxylic acid is selected from the group consisting of itaconic acid, maleic acid, fumaric acid, citraconic acid, mesaconic acid and glutaconic acid.

9. A process as claimed in claim 1, wherein the eluent is water.

10. A process as claimed in claim 1, wherein the eluent is passed through the packed layer at a rate of 0.1 to 10 ml/cm$^2$.min. per unit cross-sectional area of the layer.

11. A process as claimed in claim 10, wherein the rate is 0.5 to 5 ml/cm$^2$.min.

12. A process as claimed in claim 1, wherein the eluent has a temperature of 0°–100° C. in passing through the layer.

13. A process as claimed in claim 12, wherein said temperature is 15°–70° C.